United States Patent
Villeneuve et al.

(10) Patent No.: US 9,896,934 B2
(45) Date of Patent: Feb. 20, 2018

(54) ROTARY ENGINE WITH ROTOR LAND

(71) Applicant: Pratt & Whitney Canada Corp., Longueuil (CA)

(72) Inventors: Bruno Villeneuve, Boucherville (CA); David Gagnon-Martin, Longueuil (CA); Gilbert Ouellet, Montreal (CA)

(73) Assignee: PRATT & WHITNEY CANADA CORP., Longueuil, Quebec ( * ) Notice: Subject to any disclaimer, the term of this patent is extended or adjusted under 35 U.S.C. 154(b) by 915 days.

(21) Appl. No.: 14/108,522

(22) Filed: Dec. 17, 2013

(65) Prior Publication Data

US 2015/0167546 A1    Jun. 18, 2015

(51) Int. Cl.
| *F01C 19/08* | (2006.01) |
|---|---|
| *F01C 21/08* | (2006.01) |
| *F01C 1/22* | (2006.01) |
| *F02B 55/02* | (2006.01) |
| *F02B 55/14* | (2006.01) |

(52) U.S. Cl.
CPC .............. *F01C 19/085* (2013.01); *F01C 1/22* (2013.01); *F01C 21/08* (2013.01); *F02B 55/02* (2013.01); *F02B 55/14* (2013.01); *F04C 2240/801* (2013.01); *F04C 2270/16* (2013.01); *F05C 2201/0412* (2013.01); *F05C 2251/10* (2013.01); *Y02T 10/17* (2013.01); *Y10T 29/49234* (2015.01)

(58) Field of Classification Search
CPC .............. F01C 19/085; F04C 2240/801; F04C 2270/16
See application file for complete search history.

(56) References Cited

U.S. PATENT DOCUMENTS

| 3,059,585 | A |   | 10/1962 | Froede et al. |
|---|---|---|---|---|
| 3,782,869 | A |   | 1/1974 | Steinwart et al. |
| 3,833,321 | A | * | 9/1974 | Telang .................. F01C 21/104 418/178 |
| 3,904,328 | A | * | 9/1975 | Wilmers ................. F01C 21/08 418/61.2 |
| 3,981,688 | A | * | 9/1976 | Telang .................. F01C 19/005 418/178 |
| 4,758,139 | A |   | 7/1988 | Yagii |
| 8,033,264 | B2 | * | 10/2011 | Lauter ...................... F01C 1/22 418/178 |

FOREIGN PATENT DOCUMENTS

| GB | 1506947 | 4/1978 |
|---|---|---|
| JP | 56126623 | 10/1981 |

* cited by examiner

Primary Examiner — Mary A Davis
(74) Attorney, Agent, or Firm — Norton Rose Fulbright Canada (57) ABSTRACT

A rotary internal combustion engine with a rotor body made at least in major part of a first material, including at least one land protruding axially from each of its end faces and defining a contact surface extending at a fixed position with respect to the end faces. The contact surface frictionally engages a portion of the inner surface of the internal cavity of the engine, and at least the outer surface of the land includes a second material. The second material has a greater wear resistance than that of the first material with respect to frictional engagement with the portion of the inner surface of the internal cavity contacting the land. A method of axially positioning a rotor of a rotary engine within an internal cavity of an outer body of the engine are also discussed.

20 Claims, 8 Drawing Sheets

ROTARY ENGINE WITH ROTOR LAND

TECHNICAL FIELD

The application relates generally to rotary engines and, more particularly, to rotor lands of such engines.

BACKGROUND OF THE ART

Rotary engines of the Wankel type typically have a rotor which is axially located within the cavity of the engine through the protruding rotor lands which contact the wall cavity to act as thrust bearings. The rotor is usually made of cast iron with integral lands; typically, cast iron exhibits adequate wear resistance with respect to the continuous frictional engagement with the walls of the cavity during use of the engine. However, the maximum rotational speed of a rotary engine having a cast iron rotor engine may be limited.

SUMMARY

In one aspect, there is provided a rotary internal combustion engine comprising: an outer body enclosing an internal cavity, the outer body rotationally receiving a shaft extending through the internal cavity; a rotor body received in the internal cavity and made at least in major part of a first material, the rotor body having two axially spaced apart end faces each extending in proximity of a respective inner surface of the internal cavity, and a peripheral face extending between the end faces, the rotor body being engaged to an eccentric member of the shaft to rotate within the cavity in sealed engagement with walls defining the cavity, the rotor body including at least one land protruding axially from each of the end faces and defining a contact surface extending at a fixed position with respect to the end faces, the contact surface frictionally engaging a portion of the inner surface of the internal cavity, at least the outer surface of the land including a second material; wherein the second material has a greater wear resistance than that of the first material with respect to frictional engagement with the portion of the inner surface of the internal cavity contacting the at least one land.

In another aspect, there is provided a rotary internal combustion engine comprising: an outer body having two axially spaced apart end walls and a peripheral wall extending between the end walls, with inner surfaces of the end walls and of the peripheral wall enclosing an internal cavity, the outer body rotationally receiving a shaft extending through the internal cavity; a rotor body received in the internal cavity, the rotor body having two axially spaced apart end faces each extending in proximity of the inner surface of a respective one of the end walls, and a peripheral face extending between the end faces and defining three circumferentially spaced apex portions, the rotor body being engaged to an eccentric member of the shaft to rotate within the cavity with each of the apex portions remaining adjacent the inner surface of the peripheral wall, the rotor body including at least one land protruding axially from each of the end faces and defining a contact surface extending at a fixed position with respect to the end faces, the contact surface frictionally engaging a portion of the inner surface of a corresponding one of the end walls of the internal cavity; wherein at least the contact surface of the at least one land has a greater wear resistance than that of the first material with respect to a material of the portion of the inner surface of the corresponding one of the end walls contacting the at least one land.

In a further aspect, there is provided a method of axially positioning a rotor of a rotary engine within an internal cavity of an outer body of the engine, the method comprising: forming at least a major part of a body of the rotor from a first material, forming at least one land protruding axially and rigidly from each of the end faces with each land having a contact surface having a greater wear resistance than that of the first material with respect to frictional engagement with a same base material; and engaging the rotor within the internal cavity with the contact surface of each of the at least one land contacting a portion of a corresponding wall of the internal cavity, the portion of the corresponding wall being made of the base material.

DESCRIPTION OF THE DRAWINGS

Reference is now made to the accompanying figures in which.

DETAILED DESCRIPTION

Figure 1:
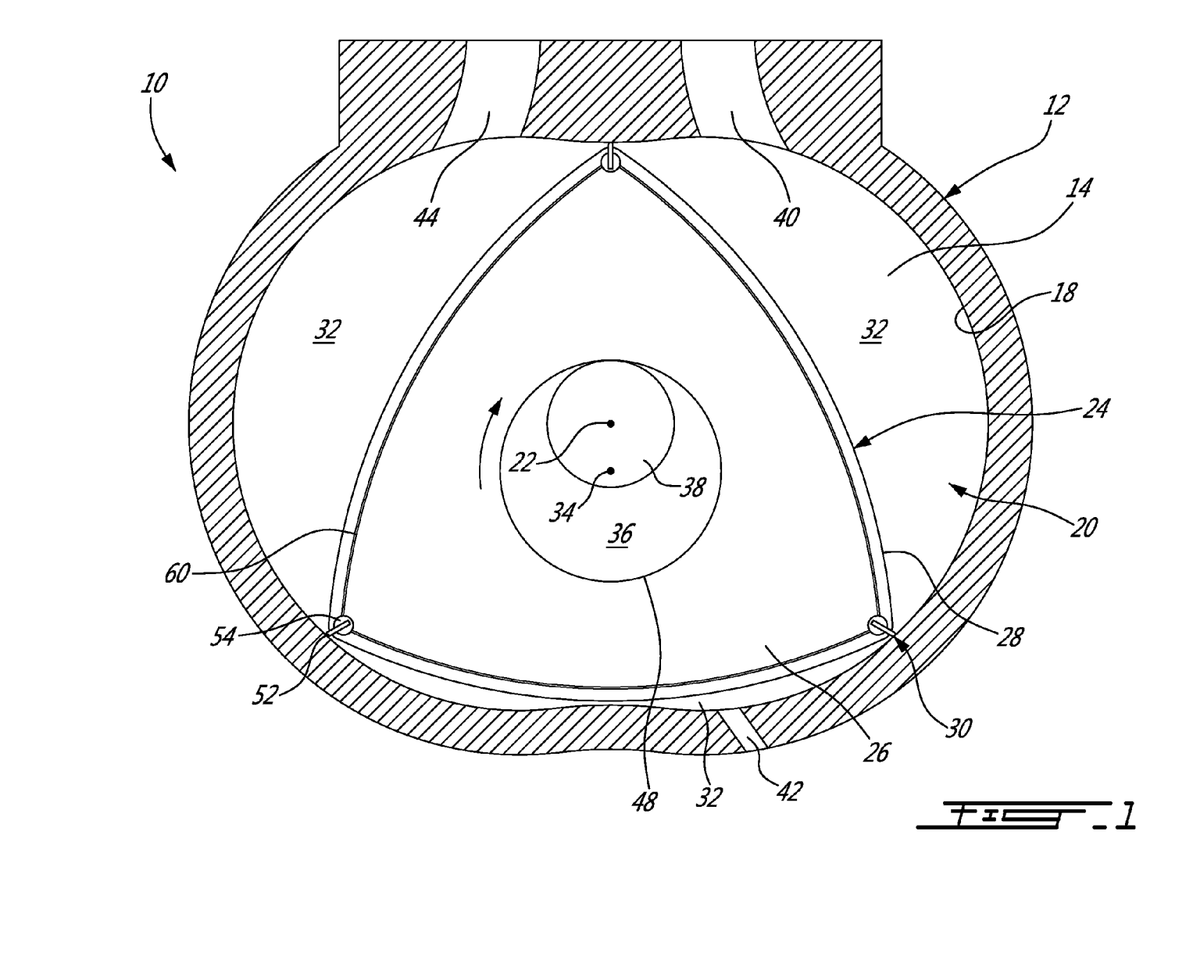
FIG. 1 is a schematic cross-sectional view of a rotary internal combustion engine in accordance with a particular embodiment.

Referring to FIG. 1, a rotary internal combustion engine 10 known as a Wankel engine is schematically and partially shown. In a particular embodiment, the rotary engine 10 is used in a compound cycle engine system such as described in Lents et al.'s U.S. Pat. No. 7,753,036 issued Jul. 13, 2010 or as described in Julien et al.'s U.S. Pat. No. 7,775,044 issued Aug. 17, 2010, the entire contents of both of which are incorporated by reference herein. The compound cycle engine system may be used as a prime mover engine, such as on an aircraft or other vehicle, or in any other suitable application. In any event, in such a system, air is compressed by a compressor before entering the rotary engine, and the engine drives one or more turbine(s) of the compound engine. In another embodiment, the rotary engine 10 is used without a turbocharger, with air at atmospheric pressure.

Although described herein as a Wankel engine, it is understood that the engine 10 can alternately be any other appropriate type of rotary engine, including other types of eccentric rotary engines.

The engine 10 comprises a stator or outer body 12 having axially-spaced end walls 14 with a peripheral wall 18 extending therebetween, such that the inner surfaces of the walls 14, 18 enclose an internal cavity 20. In the embodiment shown, the inner surface of the peripheral wall 18 has a profile defining two lobes in the cavity 20, such that the cavity has a shape which is preferably an epitrochoid.

A rotor 24 is received within the cavity 20. The rotor 24 has a body defining axially spaced end faces 26 adjacent to the outer body end walls 14, and a peripheral face 28 extending therebetween. In the embodiment shown, the peripheral face 28 defines three circumferentially-spaced apex portions 30, and a generally triangular profile with outwardly arched sides. The apex portions 30 are in sealing engagement with the inner surface of the peripheral wall 18 to form three working chambers 32 between the rotor 24 and outer body 12. The geometrical axis 34 of the rotor 24 is offset from and parallel to the axis 22 of the cavity 20.

The outer body 12 is stationary while the rotor 24 has a surface 48 journaled on an eccentric member 36 of a shaft 38, the shaft 38 being co-axial with the geometrical axis 22 of the cavity 20 and the eccentric member 36 being coaxial with the geometrical axis 34 of the rotor 24. The rotor 24 includes a phasing gear 56 (see FIG. 3) around and in proximity of the eccentric member 36 of the shaft 38 and co-axial with the rotor axis, which is meshed with a fixed stator phasing gear (not shown) secured to the outer body 12 co-axially with the shaft 38. The shaft 38 rotates the rotor 24 and the meshed gears guide the rotor 24 to perform orbital revolutions within the rotor cavity. The shaft 38 rotates three times for each complete rotation of the rotor 24 as it moves around the internal cavity 20. Upon rotation of the rotor 24 relative to the outer body 12 the working chambers 32 vary in volume.

At least one intake port 40 is defined in the outer body 12, through the peripheral wall 18 as shown or alternately through one of the end walls 14, admitting air (atmospheric or compressed) into one of the working chambers 32. At least one exhaust port 44 is defined in the outer body 12, through the peripheral wall 18 as shown or alternately through one of the end walls 14, for discharge of the exhaust gases from the working chambers 32. The intake and exhaust ports 40, 44 are positioned relative to each other and relative to an ignition mechanism and fuel injectors such that during each rotation of the rotor 24, each chamber 32 moves around the cavity 20 with a variable volume to undergo the four phases of intake, compression, expansion and exhaust, these phases being similar to the strokes in a reciprocating-type internal combustion engine having a four-stroke cycle.

In a particular embodiment, these ports 40, 44 are arranged such that the rotary engine 10 operates under the principle of the Miller or Atkinson cycle, with its volumetric compression ratio lower than its volumetric expansion ratio. In another embodiment, the ports 40, 44 are arranged such that the volumetric compression and expansion ratios are equal or similar to one another.

A passage 42 is also provided through the peripheral wall 18 for receiving a main fuel injector (not shown). In one embodiment, an additional passage is defined through the peripheral wall for receiving an ignition mechanism; another passage may also be defined for receiving a pilot fuel injector. Alternately, an additional passage is defined in communication with a pilot subchamber communicating with a pilot injector and an ignition mechanism, for providing a pilot injection.

The working chambers 32 are sealed. Each apex portion 30 of the rotor body has at least one apex seal 52 extending from one end face 26 to the other and protruding radially from the peripheral face 28. Each apex seal 52 is biased radially outwardly against the peripheral wall 18 through a respective spring. An end seal 54 engages the rotor body at end of each apex seal 52 and in engagement therewith, and is biased against the respective end wall 14 through a suitable spring. Each end face 26 of the rotor body has at least one arc-shaped face seal 60 running from each apex portion 30 to each adjacent apex portion 30, adjacent to but inwardly of the rotor periphery throughout its length. A spring urges each face seal 60 axially outwardly so that the face seal 60 projects axially away from the adjacent rotor end face 26 into sealing engagement with the adjacent end wall 14 of the cavity. Each face seal 60 is in sealing engagement with the end seal 54 adjacent each end thereof.

Figure 2:
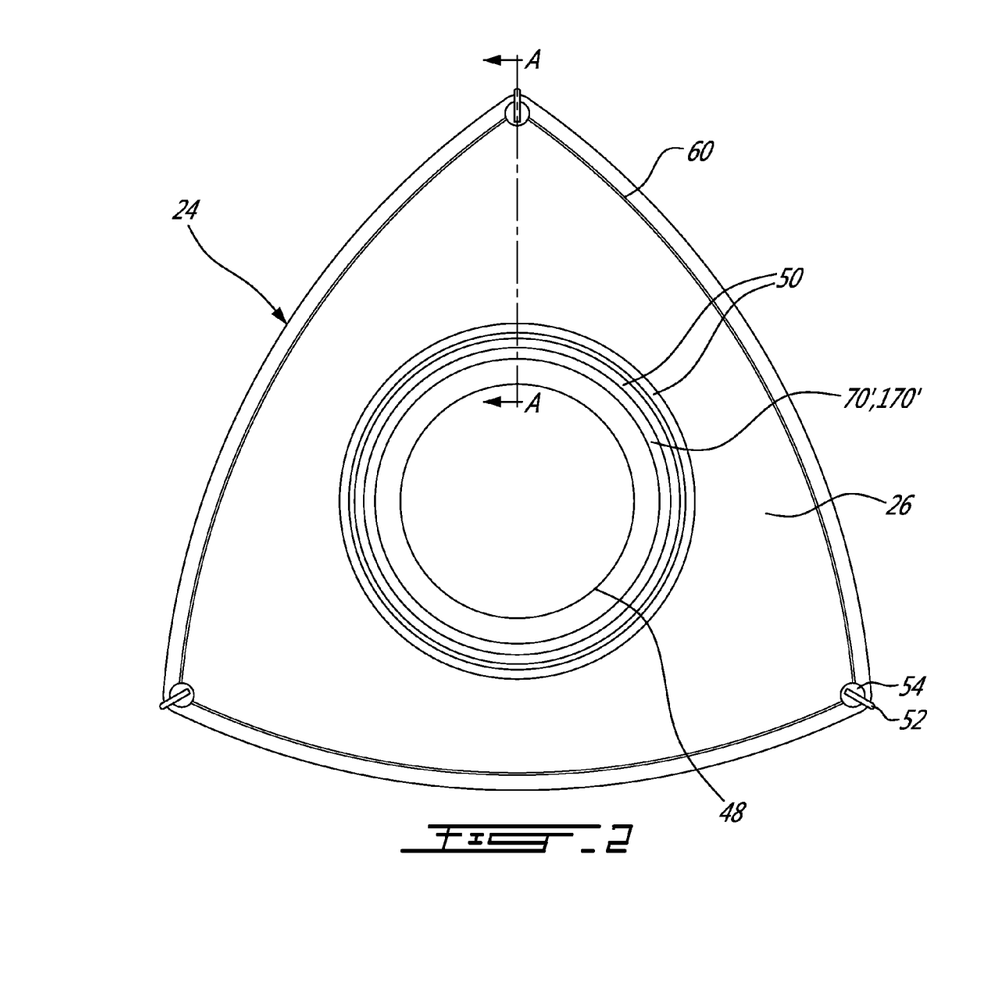
FIG. 2 is a schematic plan view of a rotor of a rotary engine such as shown in FIG. 1.

Referring to FIG. 2, one or more (two in the embodiment shown) oil seals 50 are provided in each end face 26 of the rotor body, around the central bore and the phasing gear 56 (FIG. 3) to prevent leakage flow of lubricating oil radially outwardly thereof between the respective rotor end face 26 and outer body end wall 14.

The rotor 24 includes at least one land 70, 70', 170, 270, 370 rigidly or immovably protruding from each of the end faces 26. The outer or contact surface 72 of each land extends at a fixed distance or position from the end face 26 and defines the portion of the rotor 24 contacting the adjacent end wall 14 of the internal cavity 20. The lands thus define the axial position of the rotor 24 within the cavity 20 and act as thrust bearings. A maximum axial dimension of the rotor 24 is defined between the contact surfaces of the lands extending from the opposed end faces 26.

At least the contact surface of each land has a greater wear resistance (with respect to frictional engagement with a same base material) than that of the material forming the major part, and in a particular embodiment, the entirety of the rotor body. In the present specification, the term "material of the rotor body" is intended to include both a material forming a major part of the rotor body in embodiment where different materials are provided, and a material forming the entirety of the rotor body in single material embodiments.

In a particular embodiment, this may allow for the use of a lighter material in the rotor body which may not have adequate wear resistance to support the wear from the friction between the lands and the end walls 14 of the cavity 20. A lighter rotor body (as compared to one being completely made of the heavier material having the greater wear resistance) may allow for increased rotational speeds, which in turn may cause increased friction at the land. Accordingly, in a particular embodiment, the material of the rotor body has a lower mass per volume than the material forming at least the contact surface of each land.

The term "wear resistance" as used herein refers to the capacity of a material to resist loss of material during surface frictional engagement with a particular base or reference material, and may be measured using a number of adequate tests or methods. For example, the relative wear resistance of two materials may be measured and compared by determining the volume loss of a sample of each material in frictional engagement with a same base material over a predetermined time period and under similar wear conditions, with the material having the greatest wear resistance being the material of the sample having the smallest volume loss. Test conditions used to determine wear resistance preferably simulate the operational conditions of the material in use, taking into account parameters including, but not limited to, the base material with which the material is frictionally engaged, contact pressure, relative velocity, lubrication, temperature, humidity, type of motion (sliding, reciprocating, etc.) and/or presence of a third body.

For some materials, and depending on the use conditions, increased hardness can be linked to increased wear resistance. Accordingly, in a particular embodiment, at least the contact surface of each land has a greater hardness than that of the material of the rotor body.

In a particular embodiment, the material of the rotor body includes titanium, and may be for example any appropriate type of titanium alloy. Other appropriate materials for the rotor body include, but are not limited to, aluminum alloy, titanium aluminide (gamma-TiAl), and steel including but not limited to stainless steel.

The portion of the end walls 14 contacting the land(s) has sufficient wear resistance to adequately resist the friction of the land(s) thereon. Accordingly, the base material against which the wear resistance of the lands is measured is the material of the portion of the end walls 14 contacting the lands. In a particular embodiment, each end wall includes a wear resistant coating on its face located in the cavity 20, with which the land(s) is/are in frictional engagement. For example, the end wall, which may be made of high temperature aluminium or any other appropriate material, may include a hard coating on its surface engaging the land(s); examples of such coatings include, but are not limited to, cobalt-chrome, tungsten carbide (WC), silicon carbide (SiC), nickel silicon carbide (Nikasil®), and nanocrystalline cobalt-phosphorus (nCoP). In a particular embodiment, at least the portion of each end wall 14 defining the base material contacting the land(s) has a greater hardness than that of the material of the rotor body.

In a particular embodiment, at least the contact surface of the land(s) is made of the same material as the portion of the end walls 14 contacting the land(s). Accordingly, in this embodiment, the base material against which the relative wear resistance of the material of the rotor body and of the contact surface of the land(s) is assessed is the same material as that of the contact surface of the land(s).

Figure 3:
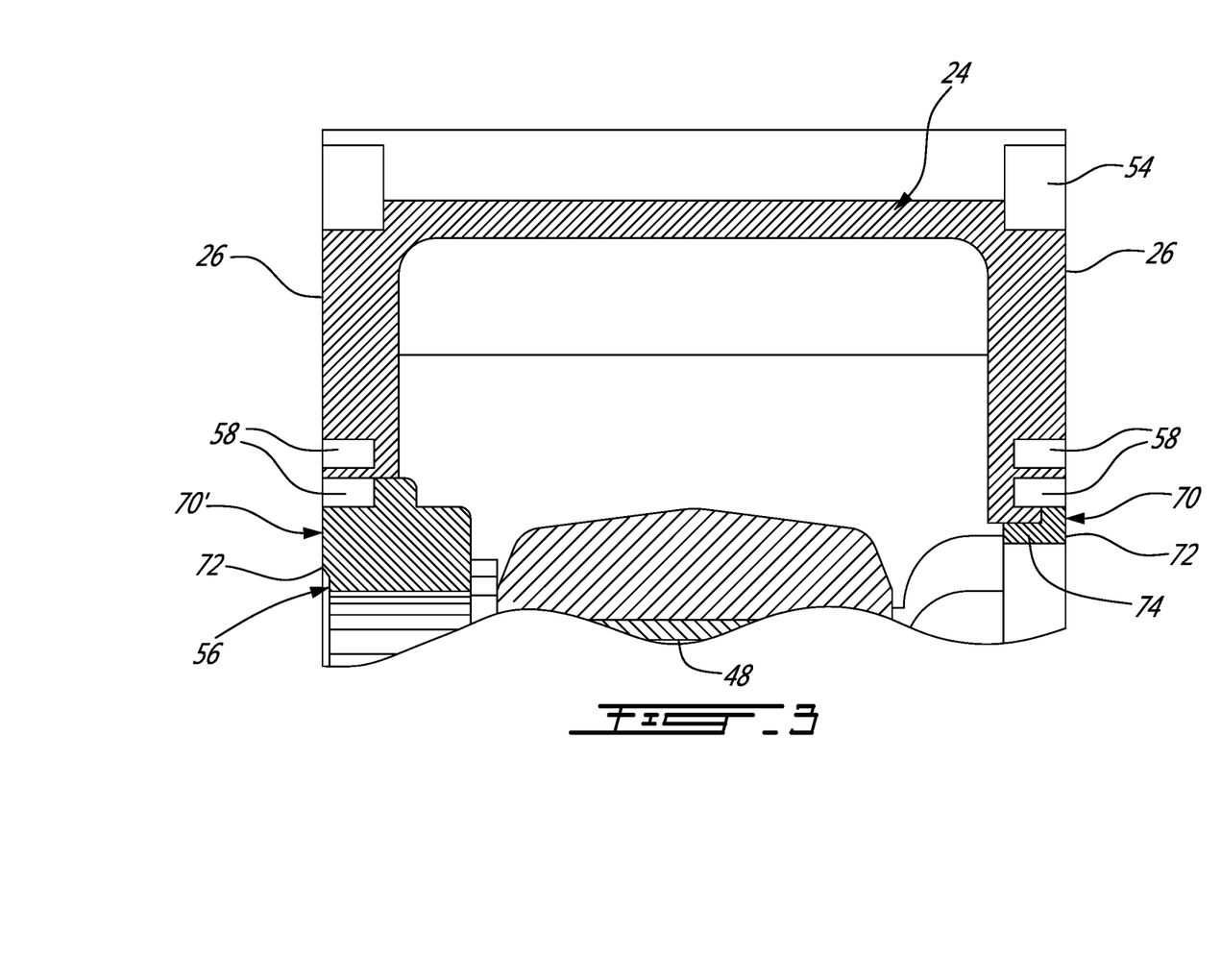
FIG. 3 is a schematic cross-sectional view of part of the rotor of FIG. 2 in accordance with a particular embodiment, taken along line A-A thereof.

In the particular embodiment shown in FIGS. 2-3, the rotor 24 includes a single annular land 70, 70' on each end face 26, with the land 70, 70' being located inwardly of the oil seal grooves 58 (FIG. 3) defined in the end face 26 to each receive one of the oil seals 50 (FIG. 2). Accordingly, the lands 70, 70' are "wet", i.e. located in the portion of the rotor which is lubricated by the oil being contained by the oil seals 50.

The land 70' of the end face 26 receiving the phasing gear 56 is defined as part of the phasing gear 56 itself, for example as a raised ring protruding beyond the end face 26 and integrally formed with the gear 56. The phasing gear 56 is thus made of a material having a greater wear resistance than that of the material of the rotor body. For example, the phasing gear 56 and associated land 70' may be made of hardened steel.

The land 70 of the other end face 26 is defined by an annular insert 74 concentric with the oil seal grooves 58, and received in a complementary recess defined in the rotor body radially inwardly of the oil seal grooves 58. It can be seen from FIG. 3 that the land 70 is spaced radially outwardly from the surface 48 of the rotor 24 engaging the eccentric member 36 of the shaft 38 (shown in FIG. 1); accordingly, the land 70 is spaced radially outwardly from the eccentric member 36 of the shaft 38. The insert 74 is retained in its recess, for example through a press-fit, such as to protrude beyond the end face 26. In the embodiment shown, the annular insert 74 has a L-shaped cross section, with an axial portion extending in contact with and radially inwardly of a circumferential surface of the rotor body, and a radial portion extending radially outwardly from the axial portion to define the protrusion from the end face 26. It is understood that other configurations and/or shapes are also considered. The insert 74 is made of a material having a greater wear resistance than that of the material of the rotor body. For example, the insert 74 may be made of hardened steel or any appropriate type of steel alloy.

Although a continuous land 70, 70' defined by a single insert 74 is shown, it is understood that a plurality of circumferentially spaced apart lands may alternately be provided, as long as their distribution allow for a stable axial retention of the rotor 24 within the internal cavity 20. For example, the plurality of lands 70, 70' may be defined by circumferentially spaced apart inserts each located on a same imaginary circle centered at the axis 34 of the rotor 24.

Figure 4:
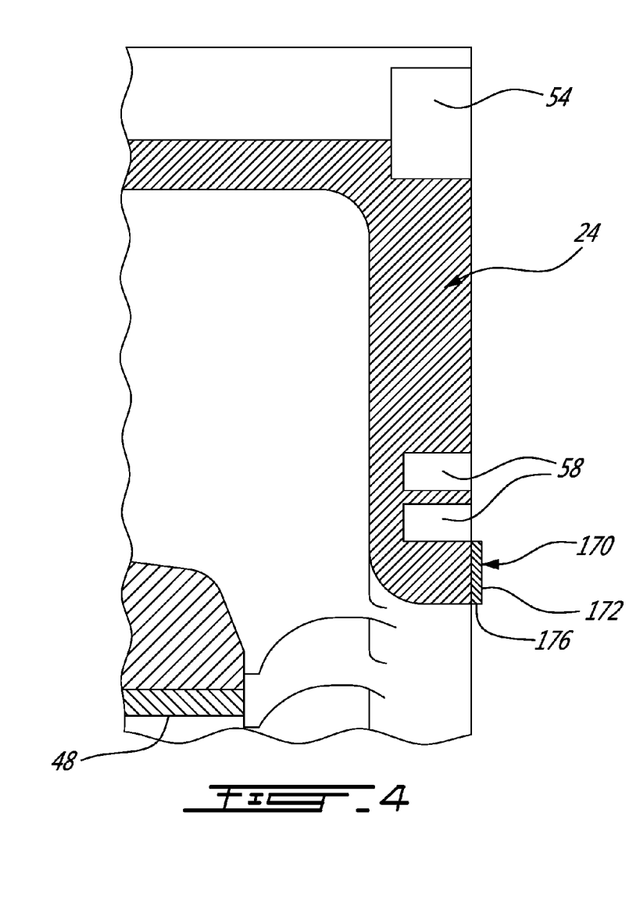
FIG. 4 is a schematic cross-sectional view of part of the rotor of FIG. 2 in accordance with another particular embodiment, taken along line A-A thereof.

In the particular embodiment shown in FIG. 4, the land 170 of the end face 26 opposite the phasing gear is also defined as a single annular "wet" land concentric with the oil seal grooves 58 and located inwardly thereof. It can be seen from FIG. 4 that the land 170 is spaced radially outwardly from the surface 48 of the rotor 24 engaging the eccentric member 36 of the shaft 38 (shown in FIG. 1); accordingly, the land 170 is spaced radially outwardly from the eccentric member 36 of the shaft 38. In this embodiment, the land 170 is made in part of the same material as the rotor body, for example by being integrally molded therewith. The outer at least contact surface 172 of the land 170 is defined by an annular layer 176 (the thickness thereof being enlarged in the Figure for clarity) having a greater wear resistance than that of the material of the rotor body.

In a particular embodiment, part of the land 170 made from the material of the rotor body protrudes from the end face 26, and the layer 176 accentuates the protrusion. Alternately, the only portion of the land 170 protruding from the end face 26 may be defined by the layer 176.

In a particular embodiment, the layer 176 is a surface layer obtained through chemical and/or physical microstructure transformation of the material of the land 170 and rotor body. The contact surface 172 of the land 170 may be exposed to a reactive substance causing a chemical transformation in that contact surface 172 and/or undergo a process causing a physical transformation in that contact surface 172 to create the layer 176 having increased wear resistance. In a particular embodiment, the material of the land 170 includes titanium, and the contact surface 172 is anodized or nitrided to create an oxide or nitride layer thereon. In another embodiment, the material of the land 170 includes a steel alloy with a high carbon content (e.g. AISI 4340), and the contact surface 172 undergoes induction hardening to create the layer 176 having increased wear resistance. In yet another embodiment, the material of the land 170 includes a steel alloy with a low carbon content (e.g. AISI 9310), and the contact surface 172 undergoes carburization (diffusion of carbon) to create the layer 176 having increased wear resistance. Any other appropriate type of chemical and/or physical microstructure transformation may be used to create a surface layer having a greater wear resistance than that of the material of the rotor body.

In another embodiment, the layer 176 is obtained through application of a coating on the land 170, with the material of the coating having a greater wear resistance than that of the material of the rotor body. In a particular embodiment, the coating is a hard coat. The coating may be deposited through any appropriate method adapted to the particular coating selected, including but not limited to physical vapor deposition (PVD) for e.g. titanium nitride (TiN) coating, chemical vapor deposition (CVD) for e.g. diamond-like carbon (DLC) coating, high velocity oxygen fuel (HVOF) for e.g. cobalt chrome coating, electrodeposition for e.g. nanocrystalline cobalt-phosphorus (nCoP) coating, and electroless plating for e.g. Nibron® (nickel, thallium and boron) coating. Any appropriate combination of coating and method may be used.

Although a continuous land 170 defined by a continuous layer 176 is shown, it is understood that a plurality of circumferentially spaced apart lands may alternately be provided, as long as their distribution allow for a stable axial retention of the rotor 24 within the internal cavity 20. For example, the plurality of lands 170 may be defined by circumferentially spaced apart layer portions each located on a same imaginary circle centered at the axis 34 of the rotor 24.

Figure 5:
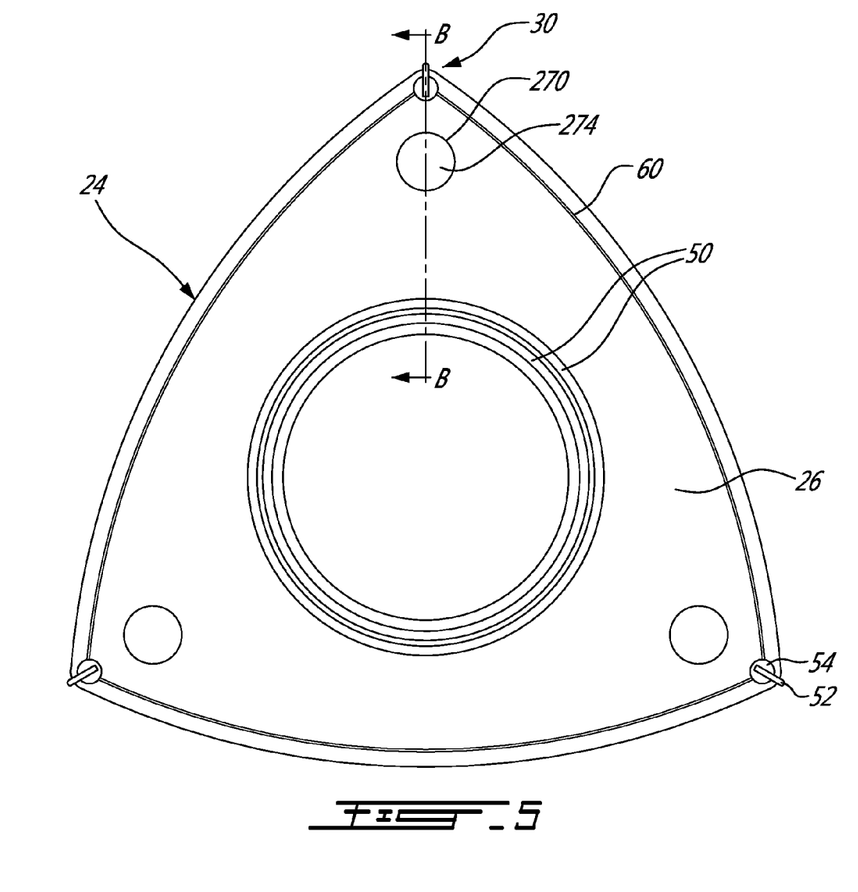
FIG. 5 is a schematic plan view of a rotor of a rotary engine such as shown in FIG. 1, in accordance with another particular embodiment.
Figure 6:
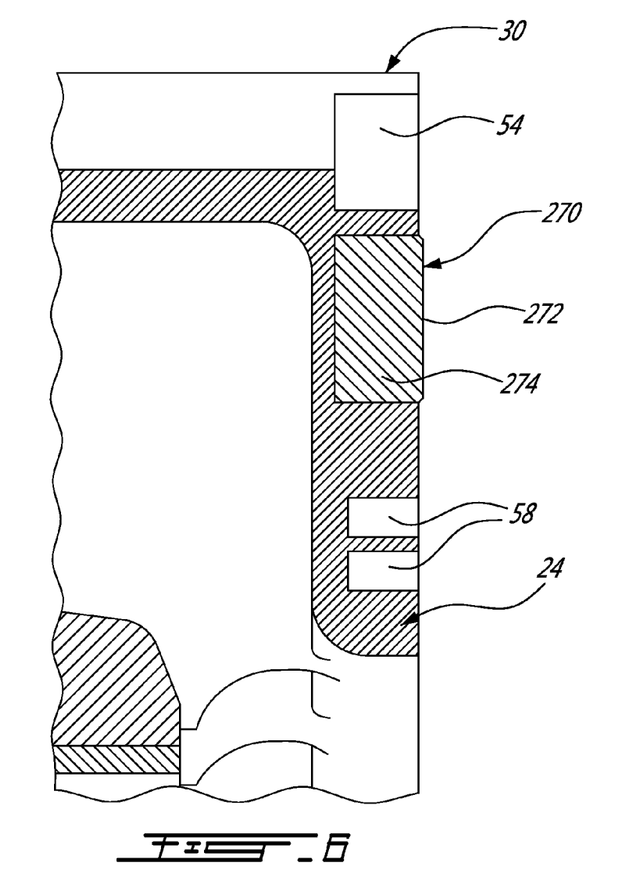
FIG. 6 is a schematic cross-sectional view of part of the rotor of FIG. 5, taken along line B-B thereof.

In the particular embodiment shown in FIGS. 5-6, each end face 26 includes a plurality of circumferentially spaced apart lands 270 located radially outwardly of the oil seal grooves 58 defined in the end face 26. Accordingly, the lands 270 are "dry", i.e. located in the portion of the rotor in which the lubricating oil does not circulate. In the embodiment shown, three (3) lands 270 are provided for each end face 26, with each land 270 being located in proximity and radially inwardly of a corresponding one of the end seal 54 in the apex portion 30. Different quantities and locations for the lands 270 are also considered, as long as their distribution allow for a stable axial retention of the rotor 24 within the internal cavity 20.

As can be seen more clearly in FIG. 6, each land 270 is defined by a cylindrical insert 274 which is received in a complementary recess defined in the rotor body radially outwardly of the oil seal grooves 58, and retained therein for example through a press-fit such that its circular outer or contact surface 272 protrudes beyond the end face 26. Although the insert 274 is shown as cylindrical, it is understood that other configurations and/or shapes are also considered. Each insert 274 is made of a material having a greater wear resistance than that of the material of the rotor body. For example, each insert 274 may be made of hardened steel or any appropriate type of steel alloy. In this embodiment, both end faces 26 include the inserts 274 in alignment with one another.

Figure 7:
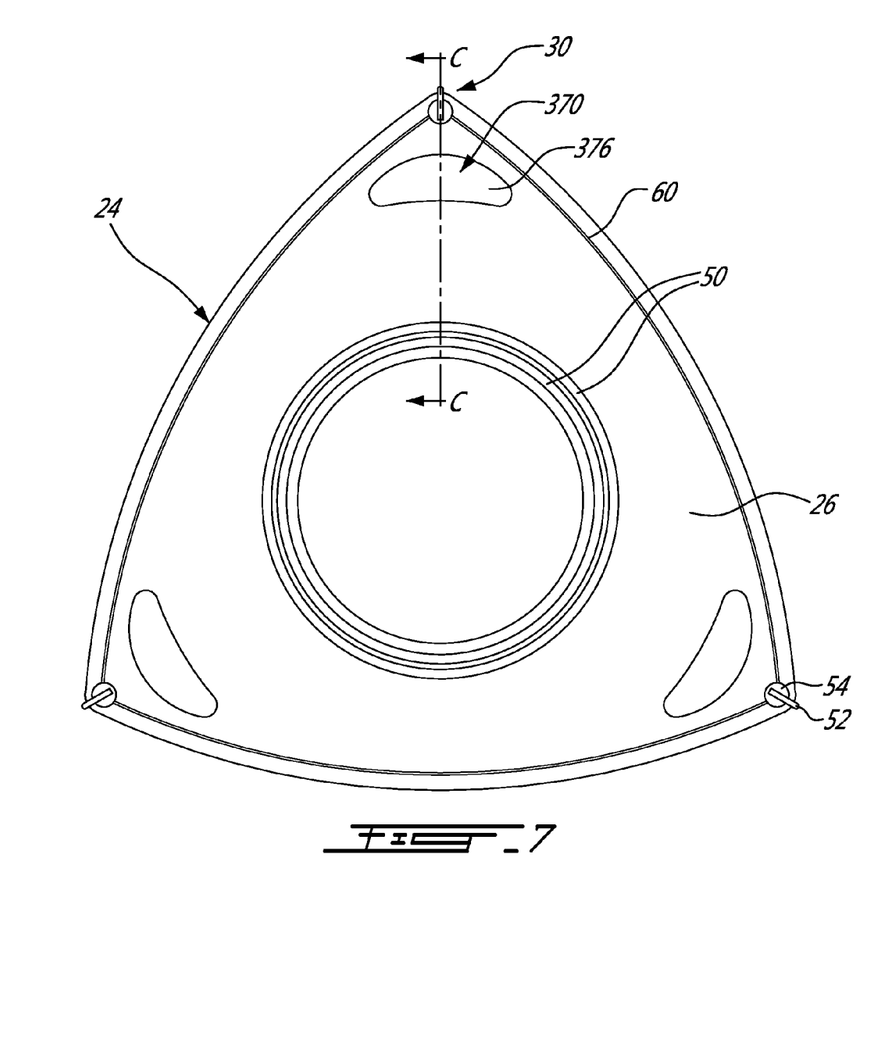
FIG. 7 is a schematic plan view of a rotor of a rotary engine such as shown in FIG. 1, in accordance with another particular embodiment.
Figure 8:
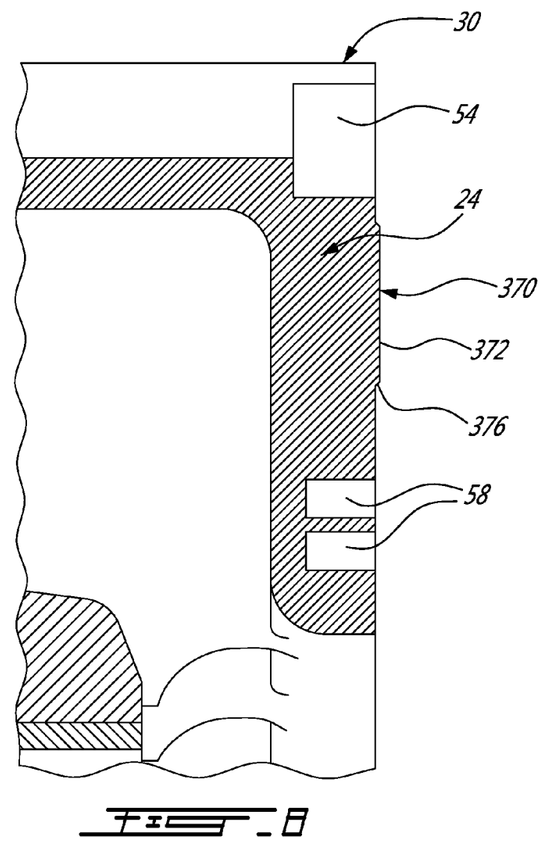
FIG. 8 is a schematic cross-sectional view of part of the rotor of FIG. 7, taken along line C-C thereof.

In the particular embodiment shown in FIGS. 7-8, each end face 26 includes a plurality of spaced apart "dry" lands 370 located radially outwardly of the oil seal grooves 58 defined in the end face 26. In the embodiment shown, three (3) lands 370 are provided for each end face 26, with each land 370 being located in proximity of a corresponding one of the apexes 30. Different quantities and locations of the lands 370 are also considered, as long as their distribution allow for a stable axial retention of the rotor 24 within the internal cavity 20. In this embodiment, each land 370 is made in part of the same material as the rotor body, for example by being integrally molded therewith. The outer or contact surface 372 of each land 370 is defined by a layer 376 (the thickness thereof being enlarged in the Figure for clarity) having a greater wear resistance than that of the material of the rotor body. In this embodiment, both end faces 26 include the layers 376 in alignment with one another.

In a particular embodiment, part of the land 370 made from the material of the rotor body protrudes from the end face 26, and the layer 376 accentuates the protrusion. Alternately, the only portion of the land 370 protruding from the end face 26 may be defined by the layer 376.

As detailed above, the layer 376 may be obtained through reactive growth of the material of the rotor body (e.g. anodization or nitridation) such that the contact surface 372 of the land 370 has a greater wear resistance than that of the material of the rotor body, or through application of a coating (e.g. hard coat) of a material having a greater wear resistance than that of the material of the rotor body on the land 370 to define the contact surface 372.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A rotary internal combustion engine comprising:
an outer body enclosing an internal cavity, the outer body rotationally receiving a shaft extending through the internal cavity;
a rotor body received in the internal cavity and made at least in major part of a first material, the rotor body having first and second axially spaced apart end faces each extending in proximity of a respective inner surface of the internal cavity, and a peripheral face extending between the first and second end faces, the rotor body including a phasing gear on the first end face, the rotor body being engaged to an eccentric member of the shaft to rotate within the internal cavity in sealed engagement with walls defining the internal cavity, the rotor body including at least one land protruding axially from each of the first and second end faces and defining a contact surface extending at a fixed position with respect to the end faces, the contact surface frictionally engaging a portion of the inner surface of the internal cavity, at least the outer surface of the land including a second material;
wherein the second material has a greater wear resistance than that of the first material with respect to frictional engagement with the portion of the inner surface of the internal cavity contacting the at least one land;
wherein the at least one land of the second end face is defined as an insert retained in a complementary recess defined in the second end face, the insert made of the second material, the at least one land of the second end face being spaced radially outwardly from the eccentric member of the shaft.

2. The engine as defined in claim 1, wherein the first material has a lower mass per volume than the second material.

3. The engine as defined in claim 1, wherein the first material includes titanium.

4. The engine as defined in claim 1, wherein the at least one land of the first end face is defined by the phasing gear engaged to the rotor body and made of the second material.

5. The engine as defined in claim 1, wherein the first material includes titanium and the second material includes steel.

6. The engine as defined in claim 1, wherein for at least one of the end faces, the at least one land includes the first material, and the outer surface thereof is defined by a surface coating of the second material applied on the first material.

7. The engine as defined in claim 6, wherein the second material includes one or more of titanium nitride, diamond-like carbon, cobalt chrome, nanocrystalline cobalt-phosphorus, nickel, thallium and boron.

8. The engine as defined in claim 1, wherein the at least one land for each of the end faces includes a plurality of spaced apart lands located radially outwardly of oil seal grooves defined in the end face.

9. The engine as defined in claim 1, wherein the outer body has two axially spaced apart end walls and a peripheral wall extending between the end walls, with inner surfaces of the end walls and of the peripheral wall enclosing the internal cavity, and the peripheral face of the rotor body defines three circumferentially spaced apex portions remaining adjacent the inner surface of the peripheral wall during rotation of the rotor, the contact surface of each land frictionally engaging a portion of the inner surface of a corresponding one of the end walls.

10. The engine as defined in claim 1, wherein the second material has a greater hardness than that of the first material.

11. The engine as defined in claim 1, wherein the second material is the same material as that of the portion of the inner surface of the internal cavity contacting the at least one land.

12. A rotary internal combustion engine comprising:
an outer body having two axially spaced apart end walls and a peripheral wall extending between the end walls, with inner surfaces of the end walls and of the peripheral wall enclosing an internal cavity, the outer body rotationally receiving a shaft extending through the internal cavity;
a rotor body received in the internal cavity, the rotor body having first and second axially spaced apart end faces each extending in proximity of the inner surface of a respective one of the end walls, and a peripheral face extending between the first and second end faces and defining three circumferentially spaced apex portions, the rotor body including a phasing gear on the first end face, the rotor body being engaged to an eccentric member of the shaft to rotate within the internal cavity with each of the apex portions remaining adjacent the inner surface of the peripheral wall, the rotor body including at least one land protruding axially from each of the first and second end faces and defining a contact surface extending at a fixed position with respect to the end faces, the contact surface frictionally engaging a portion of the inner surface of a corresponding one of the end walls of the internal cavity;
wherein at least the contact surface of the at least one land has a greater wear resistance than that of a first material forming at least a major part the rotor body with respect to frictional engagement with a material of the portion of the inner surface of the corresponding one of the end walls contacting the at least one land;
wherein the at least one land of the second end face is defined as an insert retained in a complementary recess defined in the second end face, the at least one land of the second end face being spaced radially outwardly from the eccentric member of the shaft.

13. The engine as defined in claim 12, wherein for at least one of the end faces, the at least one land includes the first material, and the contact surface thereof is defined by a layer having the greater wear resistance than that of the first material, the layer being obtained through a microstructure transformation of the first material.

14. The engine as defined in claim 12, wherein the at least one land of the first end face is defined by the phasing gear engaged to the rotor body and made of a second material having the greater wear resistance than the first material.

15. The engine as defined in claim 12, wherein for at least one of the end faces, the at least one land includes the first material, and the contact surface thereof is defined by a coating of a second material applied on the first material and having the greater wear resistance than that of the first material.

16. The engine as defined in claim 12, wherein at least the contact surface of the at least one land is made of the same material as that of the inner surface of the corresponding one of the end walls contacting the at least one land.

17. A method of axially positioning a rotor of a rotary engine within an internal cavity of an outer body of the rotary engine, the rotor being engaged to an eccentric member of a shaft and having opposed first and second end faces with the first end face being connected to a phasing gear, the method comprising:
forming at least a major part of a body of the rotor from a first material,
forming at least one land protruding axially and rigidly from each of first and second end faces of the rotor with each of the at least one land having a contact surface having a greater wear resistance than that of the first material with respect to frictional engagement with a base material, including forming the at least one land protruding axially and rigidly from the second end face with an insert retained in a complementary recess defined in the second end face, and positioned to that the at least one land of the second end face is spaced radially outwardly from the eccentric member of the shaft; and
engaging the rotor within the internal cavity with the contact surface of each of the at least one land contacting a portion of a corresponding wall of the internal cavity, the portion of the corresponding wall being made of the base material.

18. The method as defined in claim 17, wherein the first material includes titanium, and forming the at least one land includes forming the at least one land protruding from at least one of the end faces from the first material and performing a microstructure transformation on the contact surface thereof to create a surface layer having the greater wear resistance.

19. The method as defined in claim 17, wherein the first material includes titanium, and forming the at least one land includes forming the at least one land protruding from at least one of the end faces from the first material and applying a coating thereto to define the contact surface, the coating being made of a second material having the greater wear resistance.

20. The method as defined in claim 17, wherein the first material includes titanium, and the insert is made of a second material different from the base material and having the greater wear resistance.

* * * * *